(12) United States Patent
Weitkamp

(10) Patent No.: US 6,870,281 B2
(45) Date of Patent: Mar. 22, 2005

(54) WIND POWER PLANT STABILIZATION

(75) Inventor: Roland Weitkamp, Belm (DE)

(73) Assignee: General Electric Company, Schenectady, NY (US)

( * ) Notice: Subject to any disclaimer, the term of this patent is extended or adjusted under 35 U.S.C. 154(b) by 189 days.

(21) Appl. No.: 10/225,817

(22) Filed: Aug. 21, 2002

(65) Prior Publication Data

US 2003/0075929 A1 Apr. 24, 2003

(30) Foreign Application Priority Data

Aug. 22, 2001 (DE) ......................... 101 41 098

(51) Int. Cl.⁷ ............................. F02D 7/00; H02P 9/00; F03D 7/00
(52) U.S. Cl. .......................................... 290/55; 290/54
(58) Field of Search ..................................... 290/54–55

(56) References Cited

U.S. PATENT DOCUMENTS

| | | | | | |
|---|---|---|---|---|---|
| 3,770,191 | A | * | 11/1973 | Blum ........................... | 494/46 |
| 4,449,889 | A | * | 5/1984 | Belden ......................... | 416/16 |
| 4,726,736 | A | * | 2/1988 | Breuner ....................... | 416/152 |
| 4,789,305 | A | * | 12/1988 | Vaughen ...................... | 416/131 |
| 5,213,470 | A | * | 5/1993 | Lundquist ...................... | 416/9 |
| 5,263,846 | A | * | 11/1993 | Smith ........................... | 416/36 |
| 5,289,041 | A | * | 2/1994 | Holley ......................... | 290/44 |
| 5,304,036 | A | * | 4/1994 | Groen et al. ................ | 416/102 |
| 5,320,491 | A | * | 6/1994 | Coleman et al. ............. | 416/24 |
| 5,327,647 | A | * | 7/1994 | Gurniak ........................ | 29/889 |
| 5,387,080 | A | * | 2/1995 | Bouhennicha et al. ...... | 415/150 |
| 5,415,525 | A | * | 5/1995 | Desjardins et al. ..... | 416/168 R |
| 5,431,540 | A | * | 7/1995 | Doolin et al. ........... | 416/168 R |
| 5,454,153 | A | * | 10/1995 | Noel ........................... | 29/281.1 |
| 5,527,151 | A | * | 6/1996 | Coleman et al. ............. | 416/23 |
| 5,527,152 | A | * | 6/1996 | Coleman et al. ............. | 416/23 |
| 5,555,144 | A | * | 9/1996 | Wood et al. ............. | 360/98.08 |
| 5,584,655 | A | * | 12/1996 | Deering ........................ | 416/31 |
| 5,727,926 | A | * | 3/1998 | Ide et al. ................. | 416/168 R |
| 5,827,168 | A | * | 10/1998 | Howell ........................... | 494/7 |
| 5,921,148 | A | * | 7/1999 | Howell ..................... | 74/573 R |
| 6,007,298 | A | * | 12/1999 | Karem ......................... | 416/44 |
| 6,065,933 | A | * | 5/2000 | Secord ....................... | 416/142 |
| 6,099,254 | A | * | 8/2000 | Blaas et al. ................. | 416/114 |
| 6,109,876 | A | * | 8/2000 | Schreiber .................... | 416/114 |
| 6,135,713 | A | * | 10/2000 | Domzalski et al. ........... | 416/23 |
| 6,152,692 | A | * | 11/2000 | Aubry ......................... | 416/24 |
| 6,311,924 | B1 | * | 11/2001 | Ferrer ..................... | 244/17.13 |
| 6,325,326 | B1 | * | 12/2001 | Pancotti ................... | 244/17.25 |
| 6,361,275 | B1 | * | 3/2002 | Wobben ....................... | 416/33 |
| 6,641,365 | B2 | * | 11/2003 | Karem ......................... | 416/1 |
| 6,644,919 | B2 | * | 11/2003 | Bauer et al. .................. | 416/23 |
| 6,648,599 | B2 | * | 11/2003 | Preissler ....................... | 416/1 |
| 6,663,345 | B2 | * | 12/2003 | Lorkowski et al. ........... | 416/23 |
| 6,720,670 | B2 | * | 4/2004 | Makino et al. ............... | 290/55 |
| 6,726,439 | B2 | * | 4/2004 | Mikhail et al. ............. | 415/4.1 |

FOREIGN PATENT DOCUMENTS

| | | |
|---|---|---|
| DD | 252 641 A1 | 12/1987 |
| DE | 197 17 059 C1 | 7/1998 |
| EP | 0 709 571 A2 | 5/1996 |
| WO | WO 99/23384 A1 | 5/1999 |

* cited by examiner

*Primary Examiner*—Nicholas Ponomarenko
*Assistant Examiner*—Pedro J. Cuevas
(74) *Attorney, Agent, or Firm*—Blakely, Sokoloff, Taylor & Zafman LLP

(57) ABSTRACT

The invention concerns wind newer plant stabilization. An embodiment of a wind power plant includes a rotor to rotate about a rotor axis, a rotor blade coupled with the rotor, the rotor blade including a torque adjustment, and a stabilizing system to stabilize the rotor in a position, the stabilizing system including a control to adjust the torque of the rotor blade to counteract changes in a rotational position of the rotor.

48 Claims, 4 Drawing Sheets

WIND POWER PLANT STABILIZATION

Figure 1C:
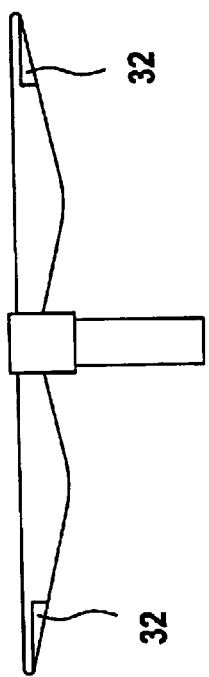

The invention concerns a wind power plant, especially a horizontal-axis wind power plant with a rotor which can, preferably, rotate about an approximately horizontal axis and at least one rotor blade extending transversely across, preferably approximately perpendicular to, the rotor axis; an adjusting means to adjust the at least one, preferably each, rotor blade, such that the torque generated by the wind load with respect to the rotor axis can be changed by the adjustment; and a stabilizing system with which the rotor can be stabilized in at least one specified, particularly a low-load rotational position (park position).

The usual horizontal-axis wind power plants comprise a tower, a rotor mounted on the tower, having at least one rotor blade, a machine housing to hold the rotor bearing, and a generator, which can be driven by the rotor through a drive which is optionally also in the machine housing.

At high wind speeds, it is usually necessary to limit the rotational speed of the rotor and the power of the generator driven by the rotor to prevent overloading the mechanical and electrical components of the wind power plant. The usual commercial wind power plants usually have an adjusting means to adjust the rotor blades such that this adjustment of the rotor blades changes the torque exerted on the rotor axis by the wind load. The rotor blade adjustment is usually done so that the rotor blades are turned through an azimuthal adjustment angle with respect to the long axis, thus altering the angle of incidence which, in turn results in a change of the torque exerted on the rotor axis by the wind load. This torque is reduced by reducing the angle of incidence. Aside from adjustment of the rotor blade by rotation about an azimuthal adjustment angle, adjustments are also known using spoilers, (camber) flaps, rotatable blade tips, or the like, which can also change the torque exerted on the rotor axis. Such solutions are included in the term "rotor blade adjustment" in the sense used in this document.

If the wind power plant is taken off the power net (in a storm, for instance), one usually wishes to park the rotor in a position with the lowest loading. The known wind power plants use stabilization systems with which the rotor is braked firmly in the park position. For wind power plants with two rotor blades, it has long been common to brake the rotor firmly in the low-load horizontal position.

EP 0 709 571 A2 recommends two low-load park positions for a two-blade rotor. In the first park position, a kind of vane effect from rotation of part of a rotor blade firmly braked in the horizontal position is used to turn the other rotor blades, which remain in the operating position, about the machine housing on the tower of the wind power plant, with the azimuth system released, into a position 90° from the wind. In the second park position, with the rotor firmly braked in the horizontal position, the adjustment axes of the rotor blades are released so that the rotor blades automatically orient themselves in a low-load direction.

In practice, both recommendations produce very high dynamic loads, because of the significant inertias in large plants (rotor blade weight: 5–15 tons; tower head (housing) weight: 80–400 tons) and because of the existing turbulence. Thus firm braking of the rotor generally gives rise to the danger of high torques, which are very harmful, especially for geared machines.

This problem can be neutralized by a rotor brake on the slow drive shaft or by a positive rotor arrest on the slow shaft. However, both solutions are relatively expensive; in the first case, because of the high braking force required, and in the second case, because of the size of the arresting elements needed and the requirement that the rotor must be positioned automatically and the arresting accomplished automatically on removal from the net.

For three-blade rotors, aside from firm braking of the rotor, it has long been the usual thing to let the rotors spin with the rotor blades turned out of the wind (feathered position) so as to give the minimum loading. Here "spin" means that the wind power plant is disconnected from the net, while the rotor is coupled to the generator but otherwise rotates unbraked. Nevertheless, this status gives a loading case which must be considered in dimensioning of many components (e.g., rotor blade and tower).

In view of the problems with the state of the technology, described above, the invention is based on the objective of reducing the loading on a wind power plant in the parked condition.

That objective is attained according to the invention by further developing known wind power plants, in a manner essentially characterized in that the stabilization system has a coupling means, in particular, a regulating means, which can be coupled to the adjusting means, with which, in case of a deviation from the specified rotation position, especially in case of the rotor being rotated out of the specified rotation position, adjustment of the at least one rotor blade can be initiated to generate a torque opposed to this deviation or rotational movement.

This invention is based on the realization that loads can be reduced in the parked status if the rotor can be stabilized in a low-load position (rotational adjustment) without using a rotor brake or rotor arrest mechanism. This can be accomplished surprisingly simply. In the operation of ordinary wind power plants, it is in any case necessary to adapt the operation to the prevailing wind conditions to stabilize the rotor in a specified rotational position or park position. It requires only an appropriate coupling or control means with which rotary movement of the rotor from its specified rotational position provides for an adjustment of the rotor blade or blades which counteracts this rotary movement. With the wind power plant according to the invention it is possible to achieve rotor stabilization with simultaneous avoidance of high dynamic loads using a coupling or control means which can be realized with a very simple design. For the wind power plant according to the invention, active control of the rotor blade adjustment in the park position can provide that the rotor is not firmly braked in a low-load position, but can "spin" without leaving this park position. In this "spinning" the rotor blade is adjusted so, particularly about the usual feathered position (blade angle ca. 90°) so that control action immediately corrects movement of the rotor from the park position because of turbulence.

As has already been discussed above, stabilization can be achieved particularly simply if the at least one rotor blade can be rotated at least partially, by the adjustment means in the usual manner, about an axis of rotation running across the rotor axis, preferably parallel to the long axis of this rotor blade. In this case the adjustment range of the rotor blades of conventional wind power plants must be extended so that it can produce a torque opposite to the usual direction of rotation of the rotor.

In addition to, or alternately to, adjustment of the rotor blade or blades by rotation, the rotor blade can also be given at least one aerodynamic auxiliary means such as a camber flap, a spoiler and/or a rotatable blade tip. In this case, the adjustment is produced in addition to, or alternately to, adjustment of this aerodynamic auxiliary means.

In the case of a one-blade or two-blade rotor, for which the invention is particularly advantageous, the rotor can appropriately be stabilized in the low-load horizontal position in which the rotor blade or blades is(are) set horizontally. As noted above, this stabilization does not necessarily have to be done by rotating the entire rotor blade. In wind power, as in flight, there are many known variants of spoilers, camber flaps, rotatable blade tips or the like, which have the same action. It has been pointed out above that it is generally necessary to use the adjusting means to stabilize the rotor position, generally establishing non-usual rotor blade angles for wind power machines with blade adjustment (pitch systems), because even a reverse rotation of the rotor may become necessary, depending on random wind turbulence (blade angle >90°).

With limited extra cost, it is also possible to design the stabilizing means so that it can also be used as a primary or secondary braking system to brake the rotor from nominal speed or excessive speed.

Such regulation can be accomplished electromechanically, with a sensor detecting the current rotor position and sending a sensor signal representing that rotor position to a signal processing system in which the current position value is compared with the desired position value and a desired value for the blade movement, or a blade angle specification, is calculated from the difference. This desired value for the blade movement can, in response, be applied to a control signal produced by the signal processing system. Thus the rotor is turned back to the park position or the horizontal park position. In the simplest case, the regulation algorithm has the nature of a simple proportional controller with the form $$\Delta(\text{blade angle}) = \text{amplification constant } k \cdot \Delta(\text{rotor position})$$

More highly evolved algorithms (such as PI, PID, adaptive, or fuzzy control) give improved regulation. In practice, even a simple PID controller will also evaluate the current rotor speed for position control. (Controllers: P: proportional. I: intearal: D: derivative (used in combination).)

It is known from simulations that it is advantageous for the controller to have different amplification constants, depending on the angle of the incident wind flow to the rotor axis. If the incident flow is at a large angle (<50°) the rotor must be turned into the wind direction with the wind follower.

It has proven to be suitable in this connection for at least one control algorithm of the control means for the wind power plant according to the invention and/or its amplification(s) to be variable, depending on, for instance, the wind direction determined with the windvane signal.

The wind power plant according to the invention can have its own means of power supply to assure operational safety in, for example, a disconnection from the power net due to a storm. With its own energy supply means, it can have both energy buffering and signal processing as well as the blade adjustment means (and perhaps the wind follower). The power supply means of a wind power plant according to the invention can, for example, be provided by at least one battery, capacitor (ultra capacitor) and/or emergency power system, especially a Diesel system. With respect to producing a cost-effective energy supply means, it has proved particularly advantageous to have a small auxiliary wind power plant mounted on, preferably, a machine gondola of the wind power plant. Multiple small auxiliary wind power plants mounted, preferably, on the machine gondola, increase the system reliability through redundancy.

It is appropriate to use a system having a power range between 5 and 100 kW as the auxiliary wind power plant. In one particularly preferred embodiment, the at least one auxiliary wind power plant is designed for an unusually high nominal speed above 25 m/s, because as a rule an emergency power supply is only needed at such high wind speeds, and thus the rotor area of the auxiliary wind power plant can be limited. It has further proved suitable for the at least one auxiliary wind power plant to be designed as a vertical-axis machine, because then only the rotor mounted on the vertical shaft must be installed on the machine housing of the main wind power plant, and the shaft can be taken through the roof of the machine so that the entire machine can be placed within the machine gondola of the wind power plant, where it is easily accessible, especially for maintenance.

Provision of an on-board energy supply means can be avoided for a wind power plant according to the invention, with the rotor being reliably stabilized in the park position so that the adjustment of the at least one rotor blade opposite to the rotary motion of the rotor can be accomplished in a purely mechanical manner. For that purpose, it is advantageous for the coupling means of the wind power plant according to the invention to have at least one coupling system with which adjustment of the at least one, preferably each, rotor blade is provided through a separable direct mechanical connection on rotation of the rotor. The coupling means can be designed like a blade adjustment, which is itself known, with a torsion shaft and/or thrust rod running at least in segments approximately parallel to the rotor axis. It passes within a main shaft which is bored out hollow and/or an axial tap, which acts on an adjusting means preferably placed within the rotor hub, by means of which a rotation of the rotor causes adjustment of at least one rotor blade. As already explained above, such a system for blade adjustment is already known. To be sure, these systems are currently being used only to hold the rotor in an arbitrary rotor position; that is, as aerodynamic rotor brakes. But the object of the embodiment of the invention just described is not the activation of a mechanical blade adjustment system for braking, but the position-controlled activation of a constructively similarly designed system to stabilize the rotor in a low-load position (horizontal for two-blade or single-blade rotors). In such a system, the stabilization of the rotor in the park position is independent of an external energy supply. External energy input will in any case be needed to actuate active adjusting elements which produce the initial setting of the low-load park position. Once the rotor has stopped in the correct park position and the mechanical coupling system has been activated (for instance, by activation of a separable mechanical coupling between the rotor position and the blade adjustment or blade angle), then the system does not need any further energy input.

The low-load park position can be attained by the following strategies:

a) Adjustment of the blade angle to the feathered position (by temporary limited activation of the stabilization system of a wind power plant according to the invention) with subsequently renewed, then continuing, activation of the system, as soon as the rotor is in the desired park position.

b) Determination of the current rotor position and the current status of the blade adjusting system or of the blade angle using an evaluation unit (preferably a data-processing system) and activation of the stabilization means in such a way that the rotor stops in the desired park position with the blades feathered.

c) Activation of the stabilization system of the wind power plant according to the invention at any arbitrary rotor position and adjusting the rotor blade angle by a second, redundant rotor blade adjusting system so that the rotor turns to the desired park position.

As already pointed out above, it is possible to design the stabilization system of the wind power plant according to the invention at little added cost so that it can also be used at the same time as the primary or secondary (redundant) braking system to stop the rotating rotor. For this purpose, the amplification factor of the proportional controller can conveniently be made higher than for the braking process. That can in principle be accomplished either by switchable connections or through "soft" continuous activation of the position control, as by controlled friction, fluid or magnetic brakes, viscous couplings, or even actively by electric or hydraulic motors.

One preferred embodiment of the invention can be produced using an arrangement of the blade adjustment system that has long been known at the state of the technology, with a torsion shaft passing through the rotor bearing, having a first braking or arresting system between the torsion shaft and the rotor, and a second braking or arresting system between the torsion shaft and a non-rotating gondola of the wind power plant. Then a relative movement between the torsion shaft and the rotor can be converted into a blade adjustment movement by many adjusting means, such as through a bevel gear, the output side of which directly drives an ordinary drive gear which acts directly on a toothed bearing ring on the blade side of a rotatable connection to the rotor blade, or indirectly through a belt drive. In this case the torsion shaft does not necessarily have to be coaxial with the rotor axis. In the case of a geared machine, it is possible to pass the torsion shaft through the main drive coaxially with the rotor shaft and then to divert it to the side through an intermediate drive (such as a belt drive or a spur gear) ahead of the drive (within the rotor shaft).

Provision of two braking systems is important for the functionality of the blade adjustment system explained above, with a torsion shaft passing through the rotor bearing, with the first braking system acting between the rotor and the torsion shaft and the second one between the (nonrotating) gondola and the torsion shaft. The two systems act alternately. It is not reasonable to activate both braking systems simultaneously, because it would be as if the rotor had been mechanically arrested directly by the brakes, but the brakes had not been designed strong enough for economic reasons. If the first braking system is activated, the blade angle is constant, independent of the rotor position or speed. If the second system is active (and the first one is not), then the rotor blade angle changes depending on the rotation of the rotor. The drive motor provided in the known blade adjustment system can act, optionally, between the gondola and the torsion shaft or between the rotor and the torsion shaft. It acts through a suitable control circuit to control the blade adjustment or blade angle. However, it is not necessary, to produce the stabilizing system of a wind power plant according to the invention, and also to brake the rotor, for the braking or arresting means to be controllable or regulatable so as to assure orientation of the rotor in the desired park position (and perhaps also braking at a specified adjustment rate). If a drive motor is provided, that makes it possible to control the blade adjustment during operation. Also, the two braking means can be very simple (especially unregulated) because the control process can be carried out by a motor.

Another advantageous embodiment of the invention provides that the coupling means is a shiftable gear, preferably a planetary gear to match the adjustment of the at least one rotor blade produced by a rotor movement to the operating state of the wind power plant. In this embodiment, it is not necessary to provide braking systems and drive motors for the torsion shaft. The shiftable drive, such as the planetary gear drive of the coupling means in this embodiment of the invention has three gear positions (like a three-speed hub on a bicycle). The first position gives a rigid connection between the rotor and the torsion shaft, holding the blade angle constant (operating position). The second position converts the rotor position, at a low gear ratio, into a blade angle (braking position). The third position converts the rotor position, with a high gear ratio, into a blade angle (park position control). In wind power plants according to the invention with gearing between the rotor and generator, it is preferable to design such a planetary gear so that the ring gear is solidly connected to the gear housing and the two shifts are accomplished by shifting the sun gear and planetary gears to the rotor and torsion shaft (as for the three-speed hub). In this case, the oil supply is particularly simple, through the lubricating system which is there for the main drive in any case. The adjustment of the low-load park position can be done through three strategies:

a) The gearing is designed so that it can be shifted under load whenever desired. Then the shift is made from position 2 (see above) to position 3 so as to give the necessary coupling of blade angle and rotor position for the desired low-load park position. If necessary (especially to maintain rotor rotation at low wind) shift position 1 can also be used for a limited time.

b) The blade angle is moved to the feathered position by shifting the gears to position 2. It is held constant at that position with the rotor idling (position 1). When the desired rotor position is attained, the rotor is temporarily held at that position with the rotor brake that is standard at the state of the art (holding brake for maintenance, for instance). The shifting gear is shifted to position 3, and the rotor brake is released again, so that the position control according to the invention is activated.

c) By shifting the gear to position 2, the blade angle is moved to the feathered position. Then the position control is activated by shifting to position 3. The blade angle is altered by a supplemental (redundant) blade adjustment system so as to get the desired coupling of rotor position and blade angle.

Of course, the principle of position regulation can also be realized with adjusting means of different types than the electromechanical or purely mechanical components described. Hydraulic systems in particular can be realized without problems. However, the direct regulatory technology linkage of the rotor position with the blade adjustment means is common for all systems. It has proved particularly convenient, in this invention, for the coupling means to have at least one friction coupling through which the at least one rotor blade is adjusted, because this prevents damage to the system by a blocked rotor blade, or adjustment of unblocked rotor blades can be done if just one rotor blade is blocked.

The operational reliability of a wind power plant according to the invention can be increased if the adjustment means comprises two independent adjustment systems, at least one of which can operate the adjustment of the at least one rotor blade even if each other adjustment system fails. The increased cost for this complete redundancy is more than compensated by the distinct reduction of the extreme loads which have to be considered in dimensioning, especially for wind power plants in the multimegawatt range. It is useful to provide an adjustment means with at least two independent adjustment systems for each blade of the rotor of a wind power plant according to the invention. These adjustment systems can each comprise a rotatable connection, which can be adjusted by a drive, between the rotor hub and the rotor blade, and which can be placed essentially concentrically with each other. It has proven advantageous for one of the two rotatable connections and its drive to be on the rotor hub and for the other rotatable connection and its drive to be outside the rotor hub. It is advantageous for the rotatable connection placed outside the rotor hub, with its drive, to be mounted on a tubular part extending between the two rotatable connections. That tubular part is preferably a fiber composite part, particularly preferably one produced in a winding process.

One of the two rotatable connections and its drive can be placed at the rotor hub and the other rotatable connection directly at the rotor blade. Then the drive for the rotatable connection placed on the rotor blade is conveniently placed essentially inside the rotor blade. In another embodiment, the drive of the rotatable connection at the rotor blade is placed essentially outside the rotor blade. In one particularly preferred embodiment, both adjustment systems can be actuated simultaneously, so that the azimuthal adjustment rate resulting from operation of the two adjustment systems is variably controllable, particularly depending on the time and/or the rotor blade angle and/or the distance of adjustment.

It is useful to control the adjustment rate of one adjustment system as a function of the adjustment distance of the other adjustment system. At least one of the adjustment systems can be produced as an electrical system. The invention also contemplates provision of a monitoring system through which the adjustment rate of each other adjustment system can be increased, at least temporarily, in case of failure of one of the two adjustment systems. Then the adjustment rate can be changed by stepwise switching on or off of batteries feeding the drive motor. In another embodiment of the invention, the adjustment rate is changed by stepwise switching of a stator winding of the drive motor. In this case the drive of one adjustment system can have a serial-wound motor and the drive of the other adjustment system can have a shunt-wound motor. In another embodiment, the drive of one adjustment system is made as a three-phase motor, while the drive of the other adjustment system is made as a direct-current motor. The axes of rotation of the two rotatable connections can be angled with respect to each other to change the blade tilt with respect to the radial plane of the rotor. It has proven particularly useful for the two rotatable connections to be made up of a single live ring bearing with three rings and two bearing housings.

The invention also contemplates provision of a stabilizing system for a wind power plant according to the invention as an improvement for already-installed wind power plants. This stabilizing system is characterized essentially by a coupling, especially a control means, which can be coupled to the adjustment direction, with which rotation of the rotor from the specified rotor position can initiate adjustment of the at least one rotor blade to produce a torque opposing that rotational movement.

The invention is described in more detail in the following, with respect to the drawing, to which reference is made for all details essential to the invention which are not explicitly described in detail. The drawing shows:

FIG. 1 A schematic representation of a first embodiment of the invention.

Figure 2:
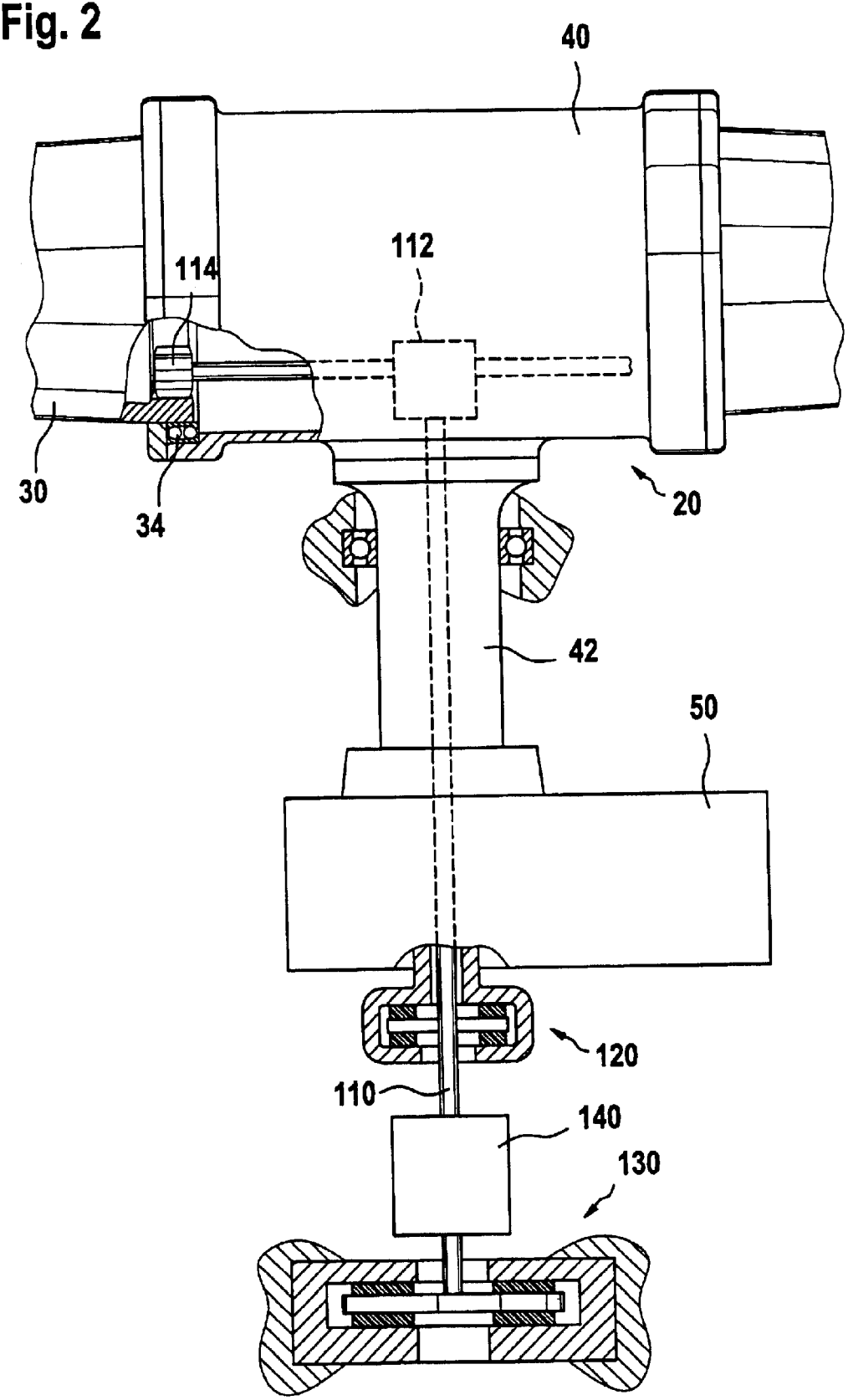

FIG. 2 A schematic representation of a second embodiment of the invention.

Figure 3:
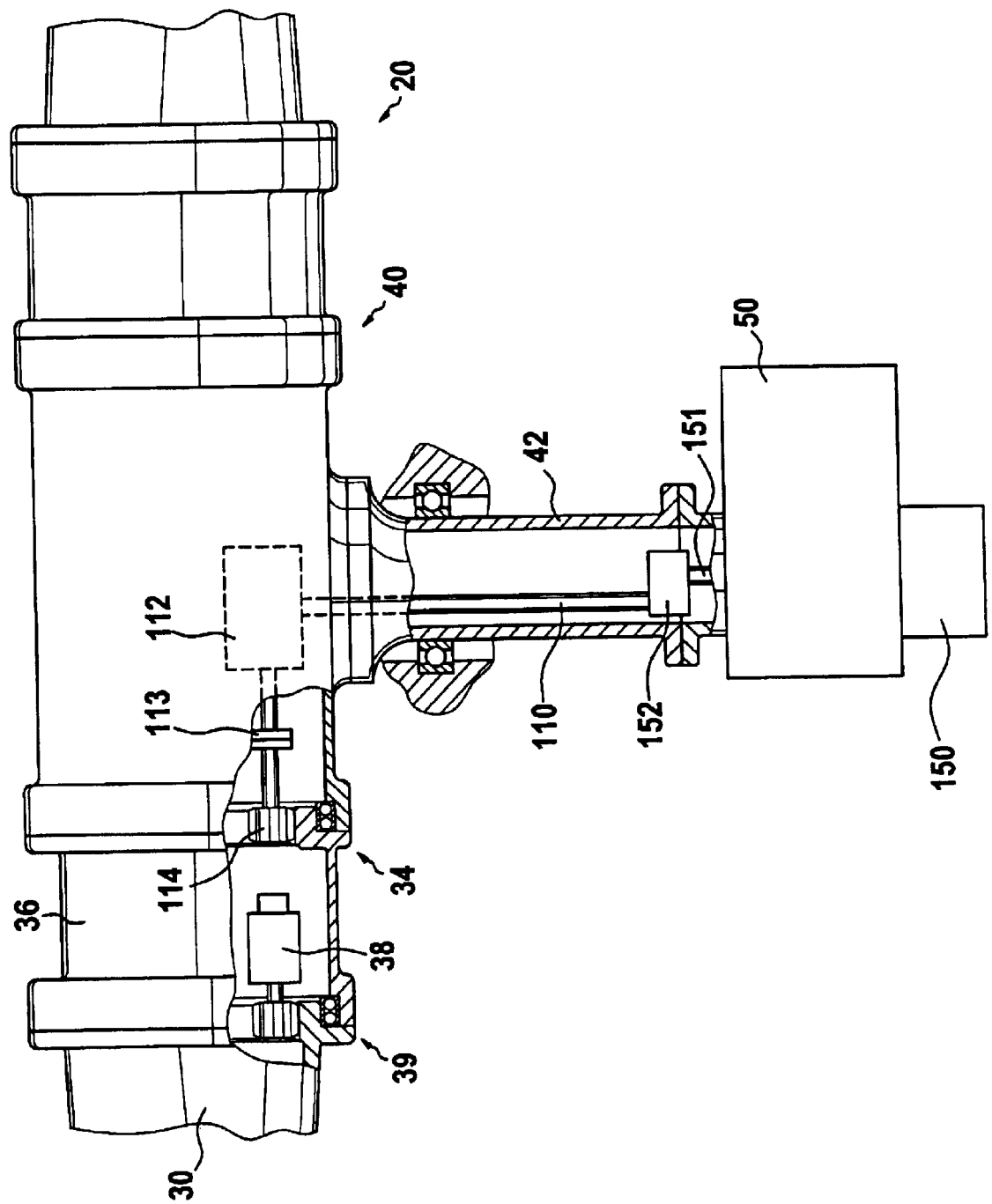

FIG. 3 A schematic representation of a third embodiment of the invention and

Figure 4:
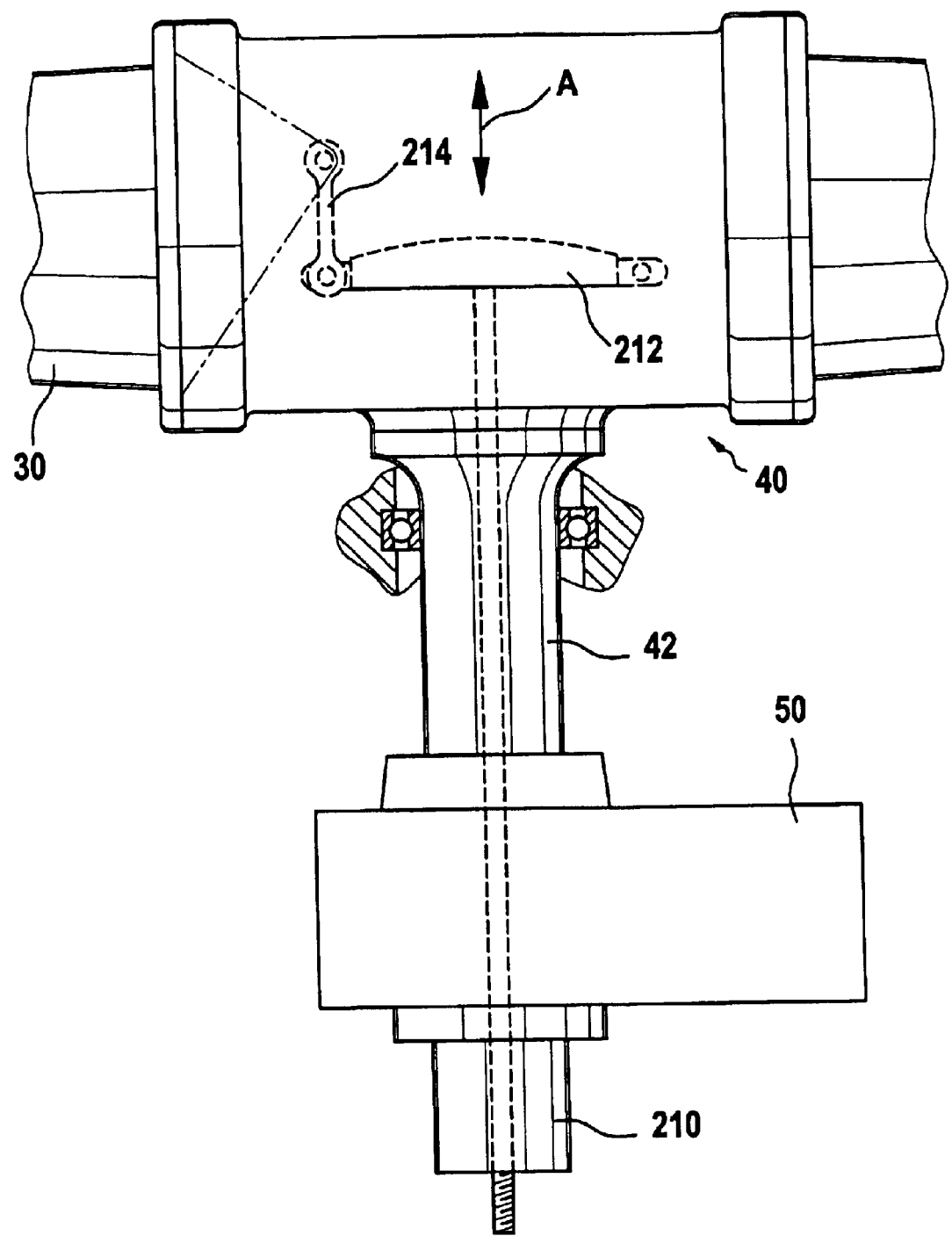

FIG. 4 A schematic representation of a fourth embodiment of the invention.

Figure 1B:
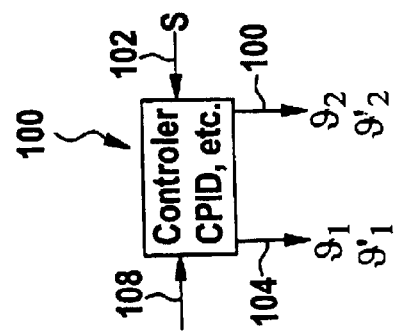
Figure 1A:
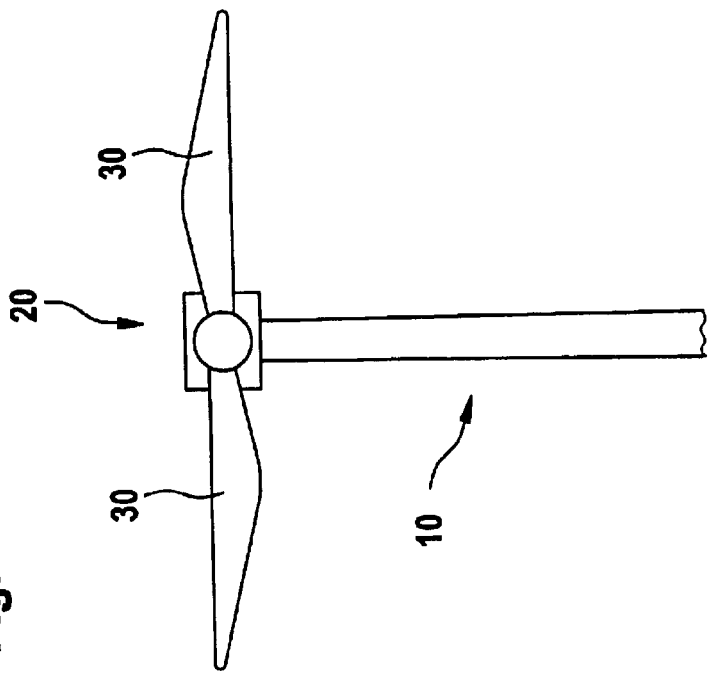

The embodiment of the invention shown in FIG. 1 comprises essentially a tower 10 and a rotor 20 with two rotor blades 30 extending perpendicularly to the rotor axis in opposite directions. FIG. 1a shows the rotor in a low-load parked position, in which the rotor blades 30 are directed horizontally. In FIG. 1b, the wind power plant shown in FIG. 1 is provided with a control means 100 which can receive, at input 102, a signal S representing the rotational position of the rotor. The control means 100 can also receive at input 106 a setpoint for the rotor position rotational position. With the control means 100, desired values $\theta_1$ and $\theta_2$ are calculated for the rotor blade position and, optionally, adjustment rates $\dot{\theta}_1$ and $\dot{\theta}_2$ are calculated. These desired values for the blade adjustment are then adjusted with a suitable blade adjustment means, also optionally utilizing the adjustment rates also calculated. The blade adjustment, in the embodiment of the invention shown in FIG. 1, can be accomplished by rotating the rotor blades 30 about axes of rotation which are parallel to their longitudinal axes. This rotation of the rotor blades 30 results in a torque acting on the rotor axis which leads to reduction of the deviation between the actual value and the desired value of the rotary position of the rotor.

As shown in FIG. 1c, the rotor blades can be equipped with aerodynamic aids 32 at the ends away from the rotor axis, which are adjusted to adjust the rotor or to produce the desired torque.

In the embodiment of the invention shown in FIG. 2, a rotor blade 30 is connected to the rotor hub 40 through a rotatable connection made as a live ring bearing 34. The hub 40 is connected to the main shaft 42 of the wind power plant through a drive 50. In the embodiment of the invention shown in FIG. 2, the rotor blade 30 is adjusted through a torsion shaft 110, a bevel gear 112 and an adjusting drive gear 114 which is driven from the torsion shaft 110 through the bevel gear 112. It meshes with the gear teeth on the inner ring of the live ring bearing 34. The torsion shaft 110 passes through the main shaft 42, made as a hollow shaft, and through the drive 50. The torsion shaft has a first braking system 120 acting between the rotor 20 and the torsion shaft 110, and a second braking system 130 acting between the torsion shaft 110 and the nonrotating gondola of the wind power plant. The torsion shaft 110 also has a drive motor 140 which can produce a rotary movement of the torsion shaft 110 about its longitudinal axis. The drive motor 140 can optionally be mounted either on the rotor or on the fixed gondola. In this embodiment of the invention, adjustment of the rotor blade 30 can be produced with the braking system 120 released by applying the braking system 130 or by designing braking system 130 so that it is stronger than braking system 120. In this case, movement of the rotor relative to the torsion shaft 110 results in turning the drive gear 114, which in turn causes adjustment of the rotor blade 30. The adjustment rate of the rotor blade can be adapted to the operating status by feedback control of braking systems 120 and 130. In addition, or alternatively, the adjustment of rotor blade 30 can also be accomplished using the drive motor 114.

In the embodiment of the invention shown in FIG. 2, the torsion shaft 110 runs coaxially with the main shaft 42 of the wind power plant.

In the embodiment of the invention shown in FIG. 3, rotation of the rotor 20 can be transferred through a shiftable planetary gear 150, an intermediate shaft 151, an intermediate drive 152, and a torsion shaft 110 to a bevel gear 112 which drives a gear 114. Gear 114 meshes with internal teeth on a rotating bearing 34. A tubular connecting piece is fastened to the rotor hub through this rotating bearing 34. At its end away from the hub 40, the tubular connecting piece 36 is connected through another rotating bearing 39 to the rotor blade 30. In the embodiment of the invention shown in FIG. 3, adjustment of the rotor blade 30 can be produced both by rotation of the drive gear 34 and by the adjusting motor 38 acting on the other rotating bearing 39. Such redundancy increases the operational safety of the wind power plant. In the embodiment of the invention shown in FIG. 3, the bevel gear 112 is connected to the drive gear 114 through a friction coupling 113. That can prevent damage to the wind power plant in case of a blocked rotor blade 30. That system can also make it possible to adjust the other rotor blades of the wind power plant through the bevel gear 112 even if one rotor blade 30 is blocked. In the embodiment of the invention shown in FIG. 3, the torsion shaft 110 is placed eccentrically with respect to the rotor axis.

In the embodiment of the invention shown in FIG. 4, there is a thrust rod 200 passing through the rotor shaft 42 and drive 50, instead of the torsion shaft 110. On rotation of the rotor, this thrust rod 200 can be forced in the direction parallel to the rotor axis, indicated by the double arrow A. That is accomplished by making the end of the thrust rod 200 away from the hub 40 in the form of a threaded spindle, held in a corresponding spindle nut 210. Movement of the thrust rod 200 is transferred to the rotor blade 30 through a traverse 212 and a coupling rod 214 in the hub. It can, for example, be converted to rotation of this rotor blade 30. The spindle nut 210 is mounted in the drive housing 50 so that it can be disconnected, thus allowing uncoupling of the rotor blade adjustment form the rotor rotation.

The invention is not limited to the embodiments explained in the drawing. For instance, it also contemplates making wind power plants with rotor blades in which the adjustment is accomplished with aerodynamic aids, such as camber flaps or spoilers and/or tips. Furthermore, a wind power plant according to the invention can also have its own energy supply means, for instance, in the form of an auxiliary wind power system. Also, the invention is not limited to just two rotor blades. It can be used with single-blade rotors or with rotors having more than two rotor blades.

What is claimed is:

1. Wind power plant, especially a wind power plant with a horizontal axis, having a rotor (20) which can rotate about a rotor axis which is preferably horizontal and at least one rotor blade (30), preferably extending approximately perpendicular to the rotor axis, an adjusting means to adjust the at least one, and preferably each, rotor blade by means of which adjustment the torque generated at the rotor axis by the wind load is adjustable, and a stabilizing system with which the rotor (20) can be stabilized in at least one specified, particularly low-load rotational position (park position), characterized in that the stabilizing system has a coupling means, especially a control means, which can be coupled to the adjustment means, with which, in case of deviation from the specified rotational position, especially in case of rotation of the rotor (20) out of the specified rotational position, adjustment of the at least one rotor blade (30) can be initiated to generate a torque counteracting this deviation or rotation.

2. Wind power plant according to claim 1, characterized in that the at least one rotor blade (3) with the adjusting means can be rotated at least partially about an axis of rotation which is transverse to the rotor axis and preferably parallel to the longitudinal axis of this rotor blade.

3. Wind power plant according to claim 1, characterized in that the at least one rotor blade (30) is assigned at least one aerodynamic aid (32) such as a camber flap, a spoiler and/or a rotatable blade tip which can be adjusted with the adjusting means.

4. Wind power plant according to claim 1, characterized in that the rotor (20) has one or two rotor blades (30) and can be stabilized in a rotational position in which the rotor blade (30) or the rotor blades (30) is/are directed approximately horizontally.

5. Wind power plant according to claim 1, characterized in that a rotational movement of the rotor (20) can be braked by adjustment of the at least one rotor blade (30) using the coupling means.

6. Wind power plant according to claim 1, characterized in that the control means has a sensor suitable for determining the rotational position of the rotor as well as a signal processing system (100) which utilizes sensor signals representing the rotational position of the rotor (20) with a control algorithm to calculate a desired value $\theta_1$, $\theta_2$, for the blade adjustment, such as with respect to the longitudinal azimuthal adjustment angle, which is adjusted by the adjustment means.

7. Wind power plant according to claim 1, characterized in that the control means is a PI controller, a PID controller, an adaptive controller, and/or a fuzzy controller.

8. Wind power plant according to claim 1, characterized in that at least one control algorithm of the control means and/or its amplification(s) can be altered depending on, for instance, the wind direction determined from windvane signals.

9. Wind power plant according to claim 1, characterized by its own energy supply means.

10. Wind power plant according to claim 9, characterized in that the energy supply means has at least one battery, capacitor, and/or emergency power system, particularly a Diesel system.

11. Wind power plant according to claim 9, characterized in that the energy supply means has a small auxiliary wind power system preferably mounted on a machine gondola of the wind power plant.

12. Wind power plant according to claim 11, characterized in that the auxiliary wind power system has a power range of 5 to 100 kW, preferably at a nominal wind velocity above 25 m/s.

13. Wind power plant according to claim 11, characterized in that the at least one auxiliary wind power system is a vertical-axle machine with its base within the machine gondola of the wind power plant.

14. Wind power plant according to one of claim 11, characterized by a buffer battery charged from the auxiliary wind power system, from which the adjustment means, the control means, and/or optional auxiliary equipment of the wind power system can be supplied.

15. Wind power plant according to claim 1, characterized in that the coupling means has at least one coupling system with which a rotational movement of the rotor produces an adjustment of at least one, preferably each, rotor blade through a separable direct mechanical coupling.

16. Wind power plant according to claim 15, characterized in that the coupling system has a torsion shaft (110) and/or thrust rod (200) which preferably runs, at least in sections, approximately parallel to the rotor axis, within a hollow-bored main shaft (42) and/or runs through a rotor bearing and acts on adjusting means (112, 114, 212, 214) preferably located inside the rotor hub (40), by which means a rotational movement of the rotor (20) causes adjustment of at least one rotor blade (30).

17. Wind power plant according to claim 16, characterized in the adjustment is produced when a relative movement occurs between the rotor (20) and the torsion shaft (110).

18. Wind power plant according to claim 16, characterized in that a first braking or arresting system (120) acting between the torsion shaft (110) and the rotor (20) and a second braking or arresting system (130) acting between the torsion shaft (110) and a nonrotating gondola of the wind power plant are assigned to the torsion shaft (110).

19. Wind power plant according to one of claim 16, characterized in that a drive means (140) is assigned to the torsion shaft (110).

20. Wind power plant according to one of claim 16, characterized in that the torsion shaft (110) runs separately from the rotor axle, at least in segments.

21. Wind power plant according to claim 1, characterized in that the coupling means is a shiftable gear, preferably a planetary gear (150) to match the adjustment of the at least one rotor blade caused by a rotor movement to the operating state of the wind power plant.

22. Wind power plant according to claim 1, characterized by a control system to adapt the adjustment rate of the at least one rotor blade to the current operating state on braking.

23. Wind power plant according to one of claim 16, characterized in that the control system can be operated to change the braking torque of a braking means coupled to the torsion shaft.

24. Wind power plant according to claim 1, characterized in that the coupling means has at least one frictional coupling (113) through which the adjustment of the at least one rotor blade (30) is produced.

25. Wind power plant according to claim 1, characterized in that the adjusting means has at least two independent adjusting systems (30, 39), one of which can operate to adjust the at least one rotor blade (30) even in case of failure of each other adjustment system.

26. Stabilizing system for a wind power plant according to one of the foregoing claims.

27. A wind power plant comprising:
a rotor to rotate about a rotor axis;
a rotor blade coupled with the rotor, the rotor blade comprising a torque adjustment; and
a stabilizing system to stabilize the rotor in a position, the stabilizing system comprising a control to adjust the torque of the rotor blade to counteract changes in a rotational position of the rotor.

28. The wind power plant of claim 27, wherein the torque adjustment comprises rotation of the rotor blade at least partially about an axis of rotation transverse to the rotor axis.

29. The wind power plant of claim 27, wherein the torque adjustment comprises an aerodynamic aid.

30. The wind power plant of claim 29, wherein the aerodynamic aid comprises one of an adjustable camber flap, spoiler, or a rotatable blade tip.

31. The wind power plant of claim 27, wherein the stabilizing system is to stabilize the rotor when the rotor is in a rotational position in which the rotor blade is horizontal.

32. The wind power plant of claim 27, wherein a rotational movement of the rotor is braked by the torque adjustment of the rotor blade.

33. The wind power plant of claim 27, further comprising a sensor to determine the rotational position of the rotor.

34. The wind power plant of claim 33, further comprising a signal processing system, the signal processing system to receive a signal from the sensor representing the rotational position of the rotor and to produce a setting for the torque adjustment using the signal.

35. The wind power plant of claim 34, wherein the signal processing system comprises one of a PI controller, a PID controller, an adaptive controller, or a fuzzy controller.

36. The wind power plant of claim 34, wherein the signal processing system utilizes a wind direction from a wind vane signal.

37. The wind power plant of claim 27, further comprising an energy supply for the stabilization system.

38. The wind power plant of claim 37, wherein the energy supply is to supply power to the stabilization system when the wind power plant is not in operation.

39. The wind power plant of claim 37, wherein the energy supply comprises one of a battery, a capacitor, or an emergency generation power system.

40. The wind power plant of claim 38, wherein the energy supply comprises an auxiliary wind power system.

41. The wind power plant of claim 40, wherein the auxiliary wind power system is mounted on a machine gondola of the wind power plant.

42. The wind power plant of claim 27, wherein the stabilization system comprises a coupling to provide adjustment of the rotor blade.

43. The wind power plant of claim 42, wherein the coupling comprises a direct mechanical coupling.

44. The wind power plant of claim 42, further comprising a torsion shaft, the coupling being coupled to the torsion shaft to provide an adjustment of the rotor blade based on rotational movement of the rotor.

45. The wind power plant of claim 44, wherein an adjustment is produced when a relative movement occurs between the rotor and the torsion shaft.

46. The wind power plant of claim 44, further comprising a first braking system to act between the torsion shaft and the rotor and a second braking system acting between the torsion shaft and a non-rotating gondola of the wind power plant.

47. The wind power plant of claim 42, further wherein the coupling comprises a shiftable gear to match the adjustment of the rotor blade to an operating state of the wind power plant.

48. The wind power plant of claim 42, wherein the coupling comprises a frictional coupling to produce an adjustment of the rotor blade.

* * * * *